US012608809B2

(12) United States Patent
    Kim et al.

(10) Patent No.:    US 12,608,809 B2
(45) Date of Patent:        Apr. 21, 2026

(54) METHOD AND SYSTEM FOR MEASURING SIZE CHANGE OF TARGET LESION IN X-RAY IMAGE

(71) Applicant: Lunit Inc., Seoul (KR)

(72) Inventors: Minchul Kim, Seoul (KR); Gunhee Nam, Seoul (KR); Thijs Kooi, Seoul (KR)

(73) Assignee: Lunit Inc., Seoul (KR)

( * ) Notice:    Subject to any disclaimer, the term of this patent is extended or adjusted under 35 U.S.C. 154(b) by 341 days.

(21) Appl. No.:    18/270,886

(22) PCT Filed:    Feb. 8, 2022

(86) PCT No.:    PCT/KR2022/001892
    § 371 (c)(1),
    (2) Date:    Jul. 5, 2023

(87) PCT Pub. No.:    WO2022/220383
    PCT Pub. Date: Oct. 20, 2022

(65)            Prior Publication Data
    US 2024/0029258 A1        Jan. 25, 2024

(30)        Foreign Application Priority Data

Apr. 12, 2021    (KR) ......................... 10-2021-0047446

(51) Int. Cl.
    G06K 9/00        (2022.01)
    G06T 7/00        (2017.01)
    G06T 7/62        (2017.01)
(52) U.S. Cl.
    CPC .............. G06T 7/0016 (2013.01); G06T 7/62 (2017.01); *G06T 2207/10116* (2013.01);
            (Continued)

(58) Field of Classification Search
    CPC ..................... G06T 7/0016; G06T 7/62; G06T 2207/10116; G06T 2207/20081;
            (Continued)

(56)            References Cited

U.S. PATENT DOCUMENTS 9,773,305  B2 *    9/2017  Lee ........................ G06T 7/0012
    10,811,135  B2 *    10/2020  Nye .......................... G06T 7/11
            (Continued)

FOREIGN PATENT DOCUMENTS

EP        3 675 130 A1      7/2020
    JP        2007-534447 A      11/2007
            (Continued)

OTHER PUBLICATIONS

Extended European Search Report issued Jun. 14, 2024 in European Application No. 22788241.2.
            (Continued)

*Primary Examiner* — Atiba O Fitzpatrick
(74) *Attorney, Agent, or Firm* — Sughrue Mion, PLLC

(57)            ABSTRACT

A method for measuring a size change of a target lesion in an X-ray image is provided, including receiving a first X-ray image including the target lesion and a second X-ray image including the target lesion, calculating an occupancy of a region corresponding to the target lesion in criterion regions in each of the first X-ray image and the second X-ray image, and measuring a size change of the target lesion based on the calculated occupancies.

14 Claims, 10 Drawing Sheets

(52) U.S. Cl.
CPC .............. *G06T 2207/20081* (2013.01); *G06T 2207/20084* (2013.01); *G06T 2207/30061* (2013.01); *G06T 2207/30096* (2013.01)

(58) Field of Classification Search
CPC . G06T 2207/20084; G06T 2207/30061; G06T 2207/30096; G06T 7/0012; G06V 2201/03; G06V 10/454; G06V 10/751; G06V 10/761; G06V 10/764; G06V 10/82; A61B 6/5217; A61B 6/50; G06F 18/22
See application file for complete search history.

(56) References Cited

U.S. PATENT DOCUMENTS

| | | | | |
|---|---|---|---|---|
| 10,825,178 | B1 * | 11/2020 | Jeong ..................... | G06N 3/084 |
| 2003/0018245 | A1 * | 1/2003 | Kaufman ............... | A61B 5/411 |
| | | | | 600/407 |
| 2016/0015355 | A1 * | 1/2016 | Yankelevitz ............. | A61B 6/03 |
| | | | | 73/866.4 |
| 2017/0236271 | A1 * | 8/2017 | Kim ...................... | G06F 16/583 |
| | | | | 382/128 |

| | | | | |
|---|---|---|---|---|
| 2017/0287175 | A1 * | 10/2017 | Lin ........................ | G16H 50/30 |
| 2020/0085382 | A1 * | 3/2020 | Taerum ................ | A61B 5/7264 |
| 2020/0211694 | A1 * | 7/2020 | Nye ........................... | G06T 7/11 |
| 2020/0380675 | A1 * | 12/2020 | Golden ................ | G06T 7/0012 |
| 2021/0271914 | A1 * | 9/2021 | Keshwani ............ | G06T 7/0012 |
| 2023/0230245 | A1 * | 7/2023 | Sasuga ................... | G06V 10/82 |
| | | | | 382/128 |
| 2025/0166187 | A1 * | 5/2025 | Golden ................. | G16H 70/20 |

FOREIGN PATENT DOCUMENTS

| | | | |
|---|---|---|---|
| JP | 4664489 | B2 | 4/2011 |
| JP | 2018-094042 | A | 6/2018 |
| JP | 2019-154943 | A | 9/2019 |
| JP | 2020-126598 | A | 8/2020 |
| KR | 10-2186893 | B1 | 12/2020 |
| WO | 2005/104943 | A2 | 11/2005 |

OTHER PUBLICATIONS

Office Action issued Jul. 16, 2024 in Japanese Application No. 2023-532580.
International Search Report for PCT/KR2022/001892 dated May 18, 2022.

* cited by examiner

FIRST X-RAY IMAGE <u>110</u>

SECOND X-RAY IMAGE <u>120</u>

100

130

MEASUREMENT RESULT OF SIZE CHANGE OF TARGET LESION 810                                              820

| | right | left |
|---|---|---|
| target | noc | bothneg |
| change_ratio | -0.024092561870805218 | 0.0 |
| output1_max | 0.7713664770126343 | 0.0 |
| output2_max | 0.7113072872161865 | 0.0 |
| lung_area1 | 11389.0 | 16108.0 |
| lung_area2 | 12076.0 | 15826.0 |
| area1 | 1739.8578579127789 | 0.0 |
| area2 | 1553.866677686572 | 0.0 |
| change_output_6way | noc | bothneg |
| change_output_3way | noc | noc |
| target_6way | noc | bothneg |
| target_3way | noc | noc |
| target_3way_int | 0 | 0 |
| target_6way_int | 0 | 3 |
| change_output_3way_int | 0 | 0 |
| change_output_6way_int | 0 | 3 |
| correct_3way | True | True |
| correct_6way | True | True |

830

METHOD AND SYSTEM FOR MEASURING SIZE CHANGE OF TARGET LESION IN X-RAY IMAGE

CROSS REFERENCE TO RELATED APPLICATIONS

This application is a National Stage of International Application No. PCT/KR2022/001892 filed Feb. 8, 2022, claiming priority based on Korean Patent Application No. 10-2021-0047446 filed Apr. 12, 2021.

TECHNICAL FIELD

The present disclosure relates to a method and system for measuring a size change of a target lesion in an X-ray image, and more specifically, to a method and system for calculating an occupancy of a region corresponding to the target lesion, on a criterion region in an X-ray image, and measuring a size change of the target lesion based on the calculated occupancy.

BACKGROUND

If multiple X-ray images of a patient are taken, changes in the lesions in the images may correspond to important information. For example, X-ray images may be continuously taken of a patient with a pneumothorax to observe a size change of the pneumothorax after procedure. A reduced size of the pneumothorax may indicate that the treatment is going well, and the increased size of the pneumothorax may indicate an emergency that may require other measures. In addition, if a specific lesion is observed in an X-ray image, information on whether the corresponding lesion has been in the same size in the past or the size was increased or decreased may be the information necessary for the treatment of the specific lesion. Accordingly, information on changes in the size of lesions over time may correspond to clinically very important information.

Doctors and patients need to know the actual size of the lesion in order to accurately perceive the information on changes in the size of the lesion. The related Computer Aided Detection (CAD) method shows the presence or absence of lesions, thus helping the doctors to read the patient's image more accurately and quickly. The lesion region (e.g., lungs) as a subject of imaging may be varied depending on the position (imaging environment) of the patient, and if only the pixel array is input, the image may not be standardized, and since there is no reference line in the X-ray, it may be difficult to calculate the actual size of the lesion using only the X-ray image. Accordingly, an error may occur in the measurement of an amount of change (or whether there is a size change) that is obtained by calculating the size of the lesion from the two X-ray images.

As a method for determining whether there is the size change of the lesion using the related CAD method, there are a method of absolutely comparing the sizes of the lesion in two X-ray images and a method of registering the X-ray images in pixel units and comparing the sizes of the lesion. According to the first method of absolutely comparing the sizes of the lesion in two X-ray images, it may be difficult to solve the problem that the size of the lesion appears differently on the images due to many variables such as the patient's posture, distance from the imaging device, and so on. That is, the change in the size of the lesion may not be accurate. In addition, according to the second method of registering X-ray images in pixel units and comparing the sizes of lesions, the size difference of the lesion can be predicted more accurately, if it is assumed that registration in pixel units is successful. Meanwhile, according to the second method, the registration in pixel units itself requires a large amount of computations, and registration of the two X-ray images may be practically impossible in a certain situation (e.g., in a situation where it is difficult to register the two X-ray images of the patient due to very different conditions) or depending on state of an image (e.g., a resolution of the image, a state according to type of storing an image). In addition, since registration in pixel units corresponds to a very complex algorithm, the computing power required for this is practically difficult to commercialize, and enormous costs may be incurred in developing the algorithm.

SUMMARY

The present disclosure has been provided to solve the problems described above, and provides a method and system for measuring a size change of a target lesion.

The present disclosure may be implemented in various ways, including a method, an apparatus (system), or a computer-readable storage medium storing instructions, and a computer program.

A method for measuring a size change of a target lesion in an X-ray image is provided, which may be performed by one or more computing devices and include receiving a first X-ray image including the target lesion and a second X-ray image including the target lesion, calculating an occupancy of a region corresponding to the target lesion in criterion regions in each of the first X-ray image and the second X-ray image, and measuring a size change of the target lesion based on the calculated occupancies.

The calculating may include determining a first criterion region and a second criterion region from each of the first X-ray image and the second X-ray image, identifying the target lesion from each of the first X-ray image and the second X-ray image, and calculating a first occupancy of the identified target lesion with respect to the first criterion region and second occupancy of the identified target lesion with respect to a second criterion region.

The determining the first criterion region and the second criterion region may include inputting the first X-ray image to a criterion region extraction model and outputting the first criterion region, and inputting the second X-ray image to the criterion region extraction model and outputting the second criterion region, and the criterion region extraction model may be trained with a plurality of reference X-ray images and label information for reference criterion regions. The second criterion region may correspond to the first criterion region.

The calculating may include calculating the first occupancy by dividing a number of pixels of a region occupied by the target lesion in the first criterion region by a number of pixels corresponding to the first criterion region, and calculating the second occupancy by dividing a number of pixels of a region occupied by the target lesion in the second criterion region by a number of pixels corresponding to the second criterion region.

The determining the first criterion region and the second criterion region may include determining a score for the first criterion region and a score for the second criterion region, the identifying the target lesion may include determining a score for the target lesion in the first criterion region, and determining a score for the target lesion in the second criterion region, and the calculating may include calculating the first occupancy based on the score for the first criterion region and the score for the target lesion in the first criterion region, and calculating a second occupancy based on the score for the second criterion region and the score for the target lesion in the second criterion region.

The determining may include determining whether there is a size change of the target lesion based on the first and second occupancies.

The determining whether there is a size change of the target lesion based on the first and second occupancies may include calculating an occupancy change amount for the target lesion based on the first and second occupancies, and determining whether there is a size change of the target lesion by comparing the calculated occupancy change amount for the target lesion with a threshold.

The threshold may be determined based on a numerical value associated with a target metric calculated for a test set or a numerical value associated with prediction accuracy.

The threshold may include a first threshold and a second threshold, in which if the calculated occupancy change amount for the target lesion is greater than or equal to the first threshold, an increase in the size of the target lesion may be determined, if the calculated occupancy change amount for the target lesion is less than the first threshold and greater than or equal to the second threshold, no change in the size of the target lesion may be determined, and if the calculated occupancy change amount for the target lesion is less than second threshold, a decrease in the size of the target lesion may be determined.

The determining whether there is a size change of the target lesion based on the first and second occupancies may include calculating an occupancy change amount for the target lesion based on the first and second occupancies, and inputting the calculated occupancy change amount for the target lesion to a change determination model to output a determination result, and determining whether there is a size change of the target lesion based on the output determination result, in which the change determination model may include a machine learning model trained to output a result of determining whether there is a size change of the reference target lesion based on the input value for the reference occupancy change amount for the target lesion.

The criterion region is a region determined by dividing the entire region of each of the first X-ray image and the second X-ray image into a plurality of regions.

There is provided a non-transitory computer-readable recording medium storing instructions for executing, on a computer, the method for measuring a size change of a target lesion described above.

An information processing system may be provided, which may include a memory storing one or more instructions, and a processor configured to execute the stored one or more instructions to receive a first X-ray image including the target lesion and a second X-ray image including the target lesion, calculate an occupancy of a region corresponding to the target lesion with respect to a criterion region in each of the first X-ray image and the second X-ray image, and measure a size change of the target lesion based on the calculated occupancy.

In some examples of the present disclosure, whether there is a size change of the target lesion can be determined based on the change in the occupancy of the target lesion with respect to the criterion region, so that the size change of the target lesion can be accurately measured with a small amount of calculation.

In some examples of the present disclosure, whether there is a size change of the target lesion can be determined based on the change in the occupancy of the target lesion with respect to the criterion region, so that measuring the size change of the target lesion may not be greatly affected by various variables such as the patient's posture and the distance from the imaging device.

In some examples of the present disclosure, whether there is a size change of the target lesion can be determined based on the change in occupancy of the target lesion with respect to the criterion region, so that separate registration of images may not be required and excessive development costs may not be required.

In some examples of the present disclosure, in the case of the lungs, there may be a size change according to inhalation or exhalation. In this case, since the size of the target lesion in the lung also changes, the ratio of the size of the target lesion to the size of the lung is maintained. Thus, a change in this ratio may represent a change in the target lesion.

In some examples of the present disclosure, in the X-ray image, a plurality of lesions in the entire region (e.g., lungs, and the like) can be separately detected, and the occupancy and/or amount of change of each lesion can be calculated, so that the size change of each lesion cab be measured.

The effects of the present disclosure are not limited to the effects described above, and other effects not described will be able to be clearly understood by those of ordinary skill in the art (hereinafter, referred to as "ordinary technician") from the description of the claims.

BRIEF DESCRIPTION OF THE DRAWINGS

Aspects of the present disclosure will be described with reference to the accompanying drawings described below, in which like reference numerals denote like elements, but are not limited thereto, in which.

DETAILED DESCRIPTION

Figure 1:
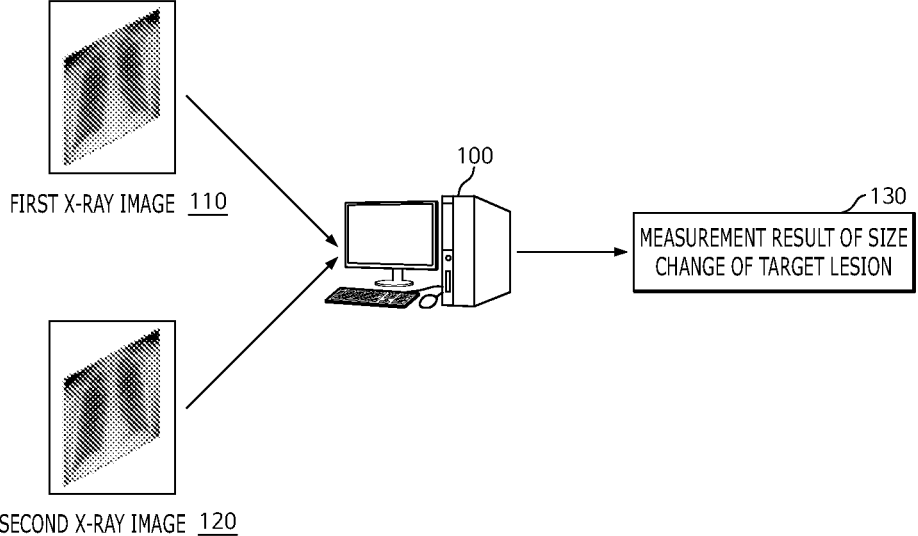
FIG. 1 is a diagram illustrating an example in which an information processing system provides a measurement result of a size change of a target lesion.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of elements are omitted, it is not intended that such elements are not included in any example.

Advantages and features of the disclosed examples and methods of accomplishing the same will be apparent by referring to examples described below in connection with the accompanying drawings. However, the present disclosure is not limited to the examples disclosed below, and may be implemented in various different forms, and the examples are merely provided to make the present disclosure complete, and to fully disclose the scope of the invention to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. As used throughout the description, if one part is referred to as "comprising" (or "including" or "having") other elements, the part can comprise (or include or have) only those elements or other elements as well as those elements unless specifically described otherwise.

Further, the term "part," "module" or "unit" used herein refers to a software or hardware component, and "part," "module" or "unit" performs certain roles. However, the meaning of the "part," "module" or "unit" is not limited to software or hardware. The "part," "module" or "unit" may be configured to be in an addressable storage medium or configured to play one or more processors. Accordingly, as an example, the "part," "module" or "unit" may include components such as software components, object-oriented software components, class components, and task components, and at least one of processes, functions, attributes, procedures, subroutines, segments of program code, drivers, firmware, micro-codes, circuits, data, database, data structures, tables, arrays, or variables. Furthermore, functions provided in the components and the "parts," "modules" or "units" may be combined into a smaller number of components and "parts," "modules" or "units", or further divided into additional components and "parts," "modules" or "units."

According to an example of the present disclosure, the "part," "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), nonvolatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

As used herein, an "X-ray image" may refer to any image taken through any inspection equipment that uses X-rays and transmits the X-rays through at least a part of the human body and takes an image. For example, the examination equipment includes, but is not limited to, a special X-ray imaging device suitable for a special part of the human body (e.g., a breast imaging device, and the like) as well as a general X-ray imaging device.

As used herein, a "target lesion" may refer to data or information, an image region, an object, and the like, for which a size change is measured. For example, the "target lesion" may include a target to be detected through an X-ray image, such as cancer or pneumothorax.

In the present disclosure, "pixel" may refer to a pixel included in an X-ray image. For example, "number of pixels" may refer to the number of pixels corresponding to a specific region in an X-ray image. In this case, if the X-ray images have the same resolution, as the number of pixels increases, the size of that specific region within the X-ray image may increase, and as the number of pixels decreases, the size of that specific region within the X-ray image may decrease.

In the present disclosure, an "artificial neural network model" is an example of a machine learning model, and may include any model used to infer an answer to a given input. The artificial neural network model may include an artificial neural network model including an input layer, a plurality of hidden layers, and an output layer. In an example, each layer may include one or more nodes. For example, the artificial neural network model may be trained to determine, identify and/or detect a criterion region and/or target lesion region in an x-ray image. In another example, an artificial neural network model may be trained to output information about a size change of a target lesion based on an occupancy change amount for the target lesion (e.g., based on a difference between a first occupancy and a second occupancy for the target lesion, a value obtained by subtracting the first occupancy from the second occupancy, or the like). In addition, the artificial neural network model may include weights associated with a plurality of nodes included in the artificial neural network model. In an example, the weights may include any parameter that is associated with the artificial neural network model.

In the present disclosure, "each of A and B" may refer to a component (e.g., region) included in A and a component included in B. For example, a "criterion region in each of the first X-ray image and the second X-ray image" may refer to a criterion region in the first X-ray image and a criterion region in the second X-ray image. As another example, an "region corresponding to the target lesion in the criterion region in each of a first X-ray image and a second X-ray image" may refer to a region corresponding to the target lesion in the criterion region in the first X-ray image and a region corresponding to the target lesion in the criterion region in the second X-ray image.

In the present disclosure, "instructions" may refer to one or more instructions grouped based on functions, which are the components of a computer program and executed by the processor.

In the present disclosure, a "user" may refer to a person who uses a user terminal. For example, the user may include an annotator who performs the annotation work. As another example, the user may include a doctor, a patient, or the like who is provided with a measurement result of the size change of the target lesion. In addition, the user may refer to the user terminal, or conversely, the user terminal may refer to the user. That is, the user and the user terminal may be interchangeably used herein.

In the present disclosure, the "annotation" may refer to an annotation work and/or annotation information (e.g., label information, and the like) determined by performing the annotation work. In the present disclosure, the "annotation information" may refer to information for the annotation work and/or information generated by the annotation work (e.g., label information).

In the present disclosure, "entire region" may refer to a region of a subject to be imaged in an X-ray image. For example, the entire region may refer to a region of an object (e.g., a patient) subject to imaging in the X-ray image, excluding a background region. Alternatively, the entire region may refer to a region obtained by imaging tissue, organ, viscera, organ system, and the like intended to be observed through the X-ray image. In addition, in the present disclosure, a "criterion region" may refer to at least a part of the entire region.

In the present disclosure, "occupancy" may refer to an occupancy ratio of a target region to the criterion region. For example, the "occupancy" may be calculated as a ratio of the size of the target lesion region to the size of the criterion region. As another example, the "occupancy" may be calculated as a ratio of the number of pixels of the target lesion region to the number of pixels of the criterion region. Additionally or alternatively, the "occupancy" may be calculated based on not only the size of the region, but also a prediction score (e.g., probability value) of the region. For example, the "occupancy" may be calculated as a ratio of the prediction score of the target lesion region (e.g., sum, average, or the like of the prediction scores of each of a plurality of pixels included in the target region) to the size of the criterion region. As another example, the "occupancy" may be calculated as a ratio of the prediction score of the target lesion region (e.g., the sum or average of prediction scores of each of a plurality of pixels included in the target region) to the prediction score of the criterion region (e.g., the sum or average of the prediction scores of each of a plurality of pixels included in the criterion region). Additionally or alternatively, the "occupancy" may be calculated based on not only the size of the target lesion, but also a probability map (e.g., heat map) of the target lesion and/or a condition of the target lesion.

FIG. 1 is a diagram illustrating an example in which an information processing system 100 provides a size change measurement result 130 of a target lesion. The information processing system 100 is any computing device used to measure the size change of the target lesion. In an example, the computing device may refer to any type of device equipped with a computing function, and may be a notebook, a desktop, a laptop, a tablet computer, a server, a cloud system, a user terminal, and the like, for example, but is not limited thereto. While the information processing system 100 is illustrated as one computing device in FIG. 1, aspects are not limited thereto, and the information processing system 100 may be configured to process information and/or data in a distributed manner through a plurality of computing devices.

The information processing system 100 may be communicatively connected to each of an imaging device (e.g., an X-ray imaging device), a user terminal, and/or a storage system (or device). In this case, the storage system may be a device or cloud system that stores and manages various data associated with a machine learning model for measuring the size change of the target lesion. For efficient data management, the storage system may store and manage various types of data using a database. In this case, various types of data may include any data associated with the machine learning model, and may include an X-ray image, label information for the criterion region, a test set, a machine learning model, and the like, for example, but are not limited thereto.

In order to measure the size change of the target lesion, the information processing system 100 may compare the target lesion region (e.g., lung region) observed in the criterion region with the criterion region in the X-ray image (or image), and calculate the occupancy of the target lesion with respect to the criterion region. That is, the information processing system 100 may calculate the occupancy of the target lesion with respect to the criterion region for each of a plurality of X-ray images obtained at different time points. The information processing system 100 may measure the size change of the target lesion in the criterion region based on a change in occupancy of the target lesion.

The information processing system 100 may receive a first X-ray image 110 including the target lesion and a second X-ray image 120 including the target lesion from an imaging device, a user terminal, and/or a storage system (or device). For example, the information processing system 100 may receive the first X-ray image 110 and the second X-ray image 120 in sequence. As another example, the information processing system 100 may receive the first X-ray image 110 and the second X-ray image 120 at the same time. In this case, the first X-ray image 110 and the second X-ray image 120 may correspond to images obtained by imaging the same individual/subject at different time points. Alternatively or additionally, the first X-ray image 110 and/or the second X-ray image 120 received by the information processing system 100 may not include the target lesion.

The information processing system 100 may generate and/or output the size change measurement result 130 of the target lesion based on the received first and second X-ray images 110 and 120. In this case, the size change measurement result 130 of the target lesion may include an absolute size value of the target lesion in each of the first X-ray image 110 and the second X-ray image 120, the occupancy, whether there is a size change of the target lesion, the degree of change, and the like.

The information processing system 100 may calculate an occupancy of a region corresponding to the target lesion with respect to the criterion region in each of the first X-ray image 110 and the second X-ray image 120. To this end, the information processing system 100 may determine a first criterion region and a second criterion region from each of the first X-ray image 110 and the second X-ray image 120, and identify and/or detect the target lesion from each of the first X-ray image 110 and the second X-ray image 120. In this example, the criterion region may refer to a region determined by dividing the entire region (e.g., the lung region) of each of the first X-ray image 110 and the second X-ray image 120 into a plurality of regions (e.g., left lung, right lung, and the like). For example, the information processing system 100 may input the first X-ray image 110 to a criterion region extraction model to output a first criterion region (e.g., the left lung region in the first X-ray image), and input the second X-ray image 120 to the criterion region extraction model to output a second criterion region (e.g., a left lung region in the second X-ray image) corresponding to the first criterion region. In this case, the information processing system 100 and/or the storage system may include the criterion region extraction model trained with a plurality of reference X-ray images and label information for reference criterion regions.

The information processing system 100 may calculate a first occupancy of the identified target lesion to the first criterion region and a second occupancy of the identified target lesion to the second criterion region. For example, the information processing system 100 may calculate the first occupancy by dividing the number of pixels of the region occupied by the target lesion in the first criterion region by the number of pixels corresponding to the first criterion region, and calculate the second occupancy by dividing the number of pixels of the region occupied by the target lesion in the second criterion region by the number of pixels corresponding to the second criterion region. As another example, the information processing system 100 may calculate the first occupancy based on a score for the first criterion region and a score for the target lesion, and calculate the second occupancy based on a score for the second criterion region and a score for the target lesion. The information processing system 100 may measure the size change of the target lesion based on the calculated occupancies. For example, the information processing system 100 may determine whether there is a size change of the target lesion based on the first occupancy of the identified target lesion in the first criterion region and the second occupancy of the identified target lesion in the second criterion region. That is, the information processing system 100 may measure the size change of the target lesion based on the change in occupancy, rather than the absolute size of the target lesion in the X-ray image.

The information processing system 100 may calculate an occupancy change amount for the target lesion based on the first and second occupancies, and compare the calculated occupancy change amount for the target lesion with a threshold to determine whether there is a size change of the target lesion. For example, the threshold may include a first threshold and a second threshold. In this case, if the calculated occupancy change amount for the target lesion is greater than or equal to the first threshold, an increase in the size of the target lesion may be determined. If the calculated occupancy change amount for the target lesion is less than the first threshold and greater than or equal to the second threshold, no change in the size of the target lesion may be determined. If the calculated occupancy change amount for the target lesion is less than second threshold, a decrease in the size of the target lesion may be determined. Additionally or alternatively, the threshold may be determined based on a numerical value associated with a target metric calculated for the test set or a numerical value associated with prediction accuracy.

The information processing system 100 may calculate an occupancy change amount for the target lesion based on the first and second occupancies, and input the calculated occupancy change amount for the target lesion to a change/determination model to determine whether there is a size change of the target lesion based on the output determination result. To this end, the information processing system 100 and/or the storage system may include the change determination model, and the change determination model may include a machine learning model trained to output a result of determining whether there is a size change of the reference target lesion based on the input value for the reference occupancy change amount for the target lesion.

Figure 2:
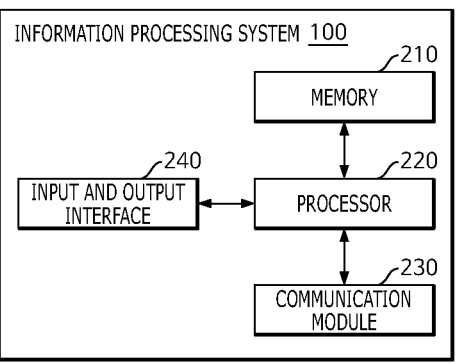
FIG. 2 is a block diagram illustrating an internal configuration of the information processing system.

FIG. 2 is a block diagram illustrating an internal configuration of the information processing system 100. The information processing system 100 may include a memory 210, a processor 220, a communication module 230, and an input and output interface 240. As illustrated in FIG. 2, the information processing system 100 may be configured to communicate information and/or data through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, and so on. In another example, a non-destructive mass storage device such as ROM, SSD, flash memory, disk drive, and so on may be included in the information processing system 100 as a separate permanent storage device that is distinct from the memory. In addition, the memory 210 may store an operating system and at least one program code (e.g., code for an application for measuring a size change of a target lesion, a program to determine a criterion region from an X-ray image, a program to identify a target lesion from an X-ray image, a program to calculate the occupancy of a target lesion, and the like).

These software components may be loaded from a computer-readable recording medium separate from the memory 210. Such a separate computer-readable recording medium may include a recording medium directly connectable to the information processing system 100, and may include a computer-readable recording medium such as a floppy drive, a disk, a tape, a DVD/CD-ROM drive, a memory card, and the like, for example. In another example, the software components may be loaded into the memory 210 through the communication module 230 rather than the computer-readable recording medium. For example, at least one program may be loaded into the memory 210 based on a computer program (e.g., code for an application for measuring a size change of a target lesion, a program to determine a criterion region from an X-ray image, a program to identify a target lesion from an X-ray image, a program to calculate the occupancy of a target lesion, and the like) which is installed by the files provided by the developers, or by a file distribution system that distributes an installation file of an application through the communication module 230.

The processor 220 may be configured to process the commands of the computer program by performing basic arithmetic, logic, and input and output computations. The commands may be provided to a user terminal (not illustrated) or another external system by the memory 210 or the communication module 230. For example, the processor 220 may be configured to execute the received commands according to a program code stored in a recording device such as the memory 210.

The communication module 230 may provide a configuration or function for the user terminal and/or an imaging device and the information processing system 100 to communicate with each other through a network, and may provide a configuration or function for the information processing system 100 to communicate with a storage device and/or another system (e.g., a separate cloud system). Control signals, commands, data, and the like provided under the control of the processor 220 of the information processing system 100 may be transmitted to the user terminal through the communication module 230 and the network and through the communication module of the user terminal. For example, the information processing system 100 may receive an X-ray image including a target lesion (e.g., a first X-ray image including the target lesion and a second X-ray image including the target lesion, and the like) from an external device (e.g., a storage device, an imaging device, an external system, and the like) through the communication module 230. Additionally, the information processing system 100 may provide a result of measuring the size change of the target lesion to the user terminal through the communication module 230.

In addition, the input and output interface 240 of the information processing system 100 may be a means for interfacing with a device (not illustrated) for inputting or outputting, which may be connected to the information processing system 100 or included in the information processing system 100. In FIG. 2, the input and output interface 240 is illustrated as a component configured separately from the processor 220, but aspects are not limited thereto, and the input and output interface 240 may be configured to be included in the processor 220. The information processing system 100 may include more components than those illustrated in FIG. 2. Meanwhile, most of the related components may not necessarily require exact illustration.

The processor 220 of the information processing system 100 may be configured to manage, process, and/or store the information and/or data received from a plurality of user terminals and/or a plurality of external systems. The processor 220 may store, process, and transmit the received first X-ray image, second X-ray image, and the like. For example, the processor 220 may calculate an occupancy of a region corresponding to the target lesion to the criterion region in each of the first X-ray image and the second X-ray image. In addition, the processor 220 may measure the size change of the target lesion based on the calculated occupancy and transmit information on the measurement result to the user terminal.

Figure 3:
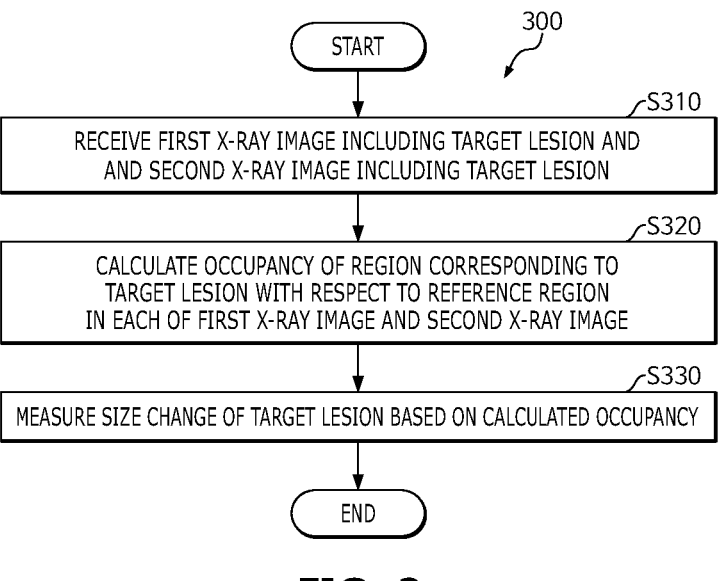
FIG. 3 is a flowchart provided to explain a method for measuring a size change of a target lesion in an X-ray image.

FIG. 3 is a flowchart illustrating a method 300 for measuring a size change of a target lesion in an X-ray image. The method 300 for measuring the size change of the target lesion may be performed by a processor (e.g., by one or more processors of an information processing system). The method 300 for measuring the size change of the target lesion may be initiated by the processor receiving the first X-ray image including the target lesion and the second X-ray image including the target lesion, at S310.

The processor may calculate an occupancy of a region corresponding to the target lesion to the criterion region in each of the first X-ray image and the second X-ray image, at S320. In this case, the criterion region may refer to a region determined by dividing the entire region of each of the first X-ray image and the second X-ray image into a plurality of regions. The processor may determine a first criterion region and a second criterion region from each of the first X-ray image and the second X-ray image, identify the target lesion from each of the first X-ray image and the second X-ray image, and calculate a first occupancy of the identified target lesion to the first criterion region and a second occupancy of the identified target lesion to the second criterion region. To this end, the processor may input the first X-ray image to the criterion region extraction model and output the first criterion region, and input the second X-ray image to the criterion region extraction model and output the second criterion region. In this case, the second criterion region may correspond to the first criterion region, and the criterion region extraction model may be a model trained with a plurality of reference X-ray images and label information for the reference criterion regions. For example, the processor may calculate the first occupancy by dividing the number of pixels of the region occupied by the target lesion in the first criterion region by the number of pixels corresponding to the first criterion region, and calculate the second occupancy by dividing the number of pixels of the region occupied by the target lesion in the second criterion region by the number of pixels corresponding to the second criterion region.

The processor may measure the size change of the target lesion based on the calculated occupancies, at S330. The processor may determine whether there is a size change of the target lesion based on the first and second occupancies. For example, the processor may determine whether there is a size change of the target lesion by comparing the calculated occupancy change amount of the target lesion (e.g., a value obtained by subtracting the first occupancy from the second occupancy) with a threshold. In this case, the threshold may include a first threshold and a second threshold, and if the value obtained by subtracting the first occupancy from the second occupancy is greater than or equal to the first threshold, an increase in the size of the target lesion may be determined. If the value obtained by subtracting the first occupancy from the second occupancy is less than the first threshold and greater than or equal to the second threshold, no change in the size of the target lesion may be determined. If the value obtained by subtracting the first occupancy from the second occupancy is less than the second threshold, a decrease in the size of the target lesion may be determined. In this example, the threshold may be determined based on a numerical value associated with a target metric calculated for the test set or a numerical value associated with prediction accuracy. As another example, the processor may input a difference between the first and second occupancies to the change determination model, and determine whether there is a size change of the target lesion based on the output determination result. In this example, the change determination model may include a machine learning model trained to output a result of determining whether there is the size change of the reference target lesion based on an input value for the reference occupancy difference.

Figure 4:
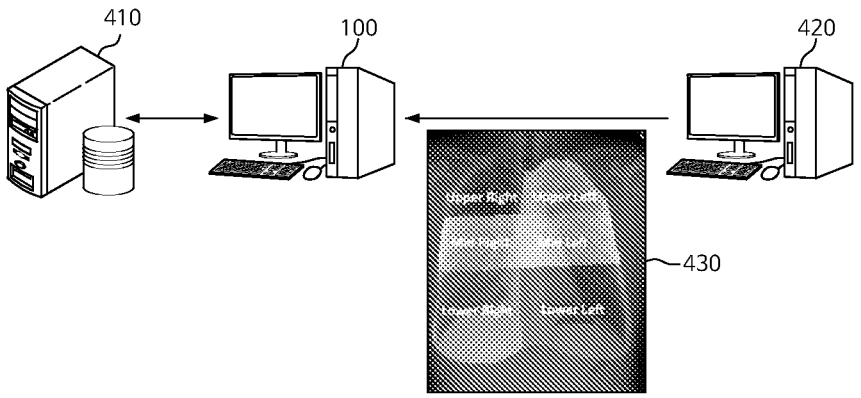
FIG. 4 is a diagram illustrating an example in which the information processing system receives label information for training a criterion region extraction model through a user terminal.

FIG. 4 is a diagram illustrating an example in which the information processing system 100 receives, through a user terminal 420, label information for training the criterion region extraction model. The X-ray image may include a commonly included region (e.g., target tissue, organ, organ system, viscera, and the like) according to the purpose. For the chest X-ray image, the position of the patient and imaging equipment may be adjusted such that the lung region is included in the image (or video). In order to measure the size change of the target lesion, a region corresponding to the criterion region may be set in the regions that may be commonly present in X-ray images (e.g., past X-ray images and current X-ray images). In this example, the criterion region may be a region determined by dividing entire region of each of the X-ray images into a plurality of regions. For example, a criterion region including at least one of six independent regions ("Upper right region", "Upper left region", "Mid right region", "Mid left region", "Lower right region", "Lower left region") used for reading the lung region in the chest X-ray image may be set. That is, each of the six independent regions or a region merging some of the six independent regions (e.g., the entire lung region, the left/right region of lung, the upper/middle/lower region of lung) may correspond to the criterion region.

To calculate the occupancy of the target lesion with respect to the criterion region, the information processing system (e.g., one or more processors of the information processing system) 100 may determine the criterion region in the X-ray image through the criterion region extraction model. To this end, the information processing system 100 may generate/learn the criterion region extraction model. The information processing system 100 may learn an algorithm for finding a criterion region in each X-ray image through machine learning. For example, the criterion region extraction model may refer to a segmentation artificial neural network model. The criterion region extraction model generated/trained in this way may be stored in an information processing system and/or a storage system. In order to generate and train the criterion region extraction model, the information processing system 100 may be communicatively connected to the user terminal 420 and/or a storage system 410.

In order to train the criterion region extraction model, the information processing system 100 may output a reference X-ray image to be annotated to the user terminal 420. In this case, the reference X-ray image to be annotated may be received from the storage system 410. A user (e.g., an annotator or the like) may determine label information (e.g., annotation information) for each of a plurality of regions (e.g., upper right region, mid right region, lower right region, upper left region, mid left region, lower left region, and the like) obtained by dividing the entire region (e.g., lung region) in the reference X-ray image output through the user terminal 420 and provide the determined label information to the information processing system 100. For example, the user (e.g., the annotator, and the like) may provide the label information for the reference criterion region to the information processing system 100 through the user terminal 420. In this case, the reference criterion region may include at least one of the plurality of regions, from which a size change of the target lesion is to be measured. The information processing system 100 may generate and/or train the criterion region extraction model using the received reference X-ray image and label information for the reference criterion region.

The information processing system 100 may provide the user terminal 420 with a plurality of chest X-ray images to as training images so as to use it as training materials for the criterion region extraction model. The user may perform annotation for the six regions of the lung in a plurality of chest X-ray images through the user terminal 420 and provide a plurality of training images including the label information for the six regions of the lung as an annotation result to the information processing system 100. For example, the plurality of training images may include training images 430 including the label information for the six regions of the lung. The information processing system 100 may generate and train a model for determining each of the six regions of the lung from the chest X-ray image based on a plurality of training images including the training image 430 including the label information. Additionally or alternatively, the information processing system 100 may generate and/or train a model for determining a criterion region from a chest X-ray image based on the training image and the label information. In this case, the criterion region may include at least one of the six regions of the lung.

The information processing system 100 may learn an algorithm that receives one X-ray image as an input, and may learn in a manner of minimizing a loss with the label information (that is, annotation information) for the six regions of the lung. For example, the information processing system 100 may calculate a probability that each pixel of the image corresponds to each region, by using the label information for the six regions of the lung in the X-ray image. In this case, it may be assumed that the image is not flipped so as to distinguish left/right of each region. In addition, in order to remove noise, a threshold may be set such that a value lower than this value may be clipped.

While FIG. 4 illustrates one user terminal 420, aspects are not limited thereto, and in an exemplary configuration, a plurality of user terminals 420 may be connected to the information processing system 100 for communication. In addition, while the storage system 410 is illustrated as a single device in FIG. 4, aspects are not limited thereto, and the system may be configured with a plurality of storage devices or as a system that supports cloud. In addition, respective components of the system for generating/training the criterion region extraction model illustrated in FIG. 4 represent functional components that can be divided on the basis of functions, and in an actual physical environment, a plurality of components may be implemented as being incorporated with each other. While FIG. 4 shows the information processing system 100 and the storage system 410 as separate systems, the present disclosure is not limited thereto, and they may be incorporated into one system.

Figure 5:
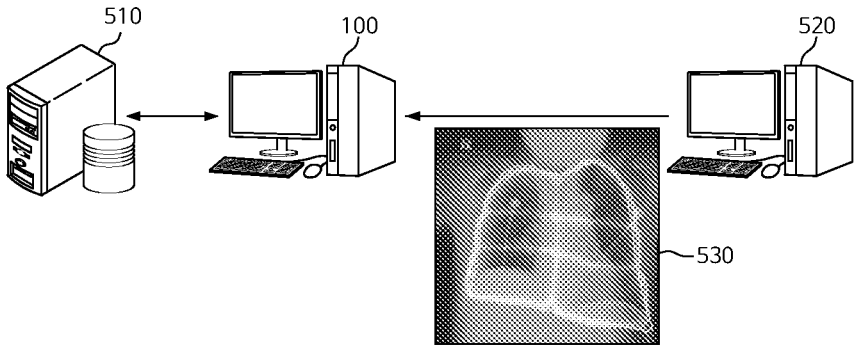
FIG. 5 is a diagram illustrating an example in which the information processing system determines a criterion region in an X-ray image and outputs the determined criterion region through a user terminal.

FIG. 5 is a diagram illustrating an example in which the information processing system 100 determines a criterion region in an X-ray image and outputs the determined criterion region through a user terminal 520. To measure the size change of the target lesion, the information processing system 100 (e.g., one or more processors of the information processing system) may determine a criterion region in the X-ray image. In this case, the criterion region may be determined by dividing the entire region of the X-ray image into a plurality of regions. The information processing system 100 may determine a first criterion region and a second criterion region from each of the first X-ray image and the second X-ray image. The information processing system 100 may input the first X-ray image to the criterion region extraction model and output the first criterion region, and input the second X-ray image to the criterion region extraction model and output the second criterion region. In this case, the second criterion region may correspond to the first criterion region. For example, if the region corresponding to the left lung in the first X-ray image corresponds to the first criterion region, the region corresponding to the left lung in the second X-ray image may also correspond to the second criterion region.

The information processing system 100 may receive target X-ray images (e.g., the first X-ray image and the second X-ray image) to measure a size change of the target lesion. For example, the information processing system 100 may receive the target X-ray image from a storage system 510, the user terminal 520, and/or an imaging device. The information processing system 100 may determine a criterion region from the received target X-ray images. For example, the information processing system 100 may divide the entire region in the target X-ray image into a plurality of regions to determine the criterion region. As shown, the information processing system 100 may divide the lung region in the target X-ray image into six regions (e.g., "Upper right region", "Upper left region", "Mid right region", "Mid left region", "Lower right region", "Lower left region") to determine the criterion region. In this case, the criterion region may include at least some of a plurality of regions. A tissue (e.g., lung) region in the target X-ray image may be divided into a plurality of regions, and any combination of the plurality of divided regions may be determined as the criterion region. In this case, the occupancy may be calculated by calculating a ratio of the size of the lesion in the criterion region that is a combination of the plurality of regions. For example, the criterion region may be determined as a right lung region including "Upper right region", "Mid right region", and "Lower right region".

In FIG. 5, the information processing system 100 outputs an X-ray image 530 showing a plurality of lung regions through the user terminal 520, but aspects are not limited thereto. For example, after performing all processes of dividing the entire region into a plurality of regions, determining a criterion region, and measuring the size change of the target lesion, the information processing system 100 may output only the size change measurement result through the user terminal 520. In this case, the information processing system 100 may not separately output an X-ray image showing a plurality of lung regions or criterion regions through the user terminal 520.

In addition, while FIG. 5 illustrates one user terminal 520, aspects are not limited thereto, and in an exemplary configuration, a plurality of user terminals 520 may be connected to the information processing system 100 for communication. In addition, while the storage system 510 is illustrated as a single device in FIG. 5, aspects are not limited thereto, and the system may be configured with a plurality of storage devices or as a system that supports cloud. In addition, respective components of the system for generating/training the criterion region extraction model illustrated in FIG. 5 represent functional components that can be divided on the basis of functions, and in an actual physical environment, a plurality of components may be implemented as being incorporated with each other. While FIG. 5 shows the information processing system 100 and the storage system 510 as separate systems, the present disclosure is not limited thereto, and they may be incorporated into one system.

Figure 6:
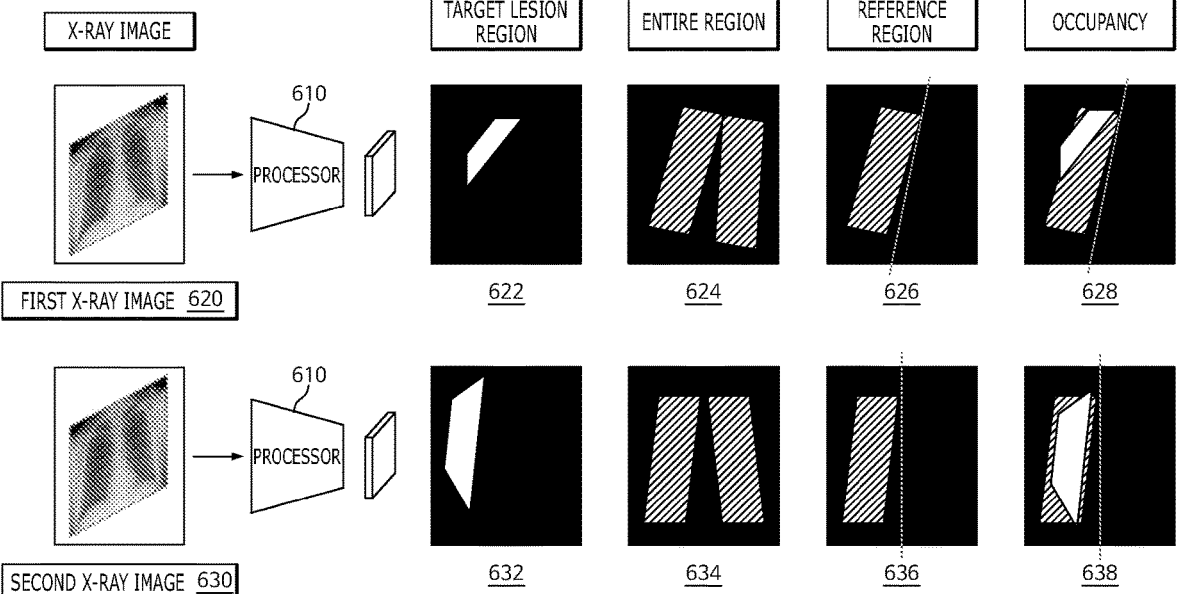
FIG. 6 is a diagram illustrating an example of calculating a first occupancy from a first X-ray image and calculating a second occupancy from a second X-ray image.

FIG. 6 is a diagram illustrating an example of calculating a first occupancy 628 from a first X-ray image 620 and calculating a second occupancy 638 from a second X-ray image 630. A processor (e.g., one or more processors of the information processing system) 610 may receive the first X-ray image 620 including the target lesion and the second X-ray image 630 including the target lesion, and calculate an occupancy of a region corresponding to the target lesion with respect to the criterion region of each of the first X-ray image 620 and the second X-ray image 630. In this case, the occupancy may refer to the size (e.g., number of pixels) of a lesion positioned in the criterion region compared to the size (e.g., number of pixels) of the criterion region. For example, if the left lung corresponds to the criterion region, the occupancy of the target lesion in the left lung may refer to the size (e.g., number of pixels) of the target lesion positioned in the left lung compared to the size (e.g., number of pixels) of the left lung in the X-ray image.

The processor 610 may determine a first criterion region 626 and a second criterion region 636 from each of the first x-ray image 620 and the second x-ray image 630, and identify a target lesion from each of the first X-ray image 620 and the second X-ray image 630. The processor 610 may calculate the first occupancy 628 of the identified target lesion with respect to the first criterion region 626 and the second occupancy 638 of the identified target lesion with respect to the second criterion region 636. For example, as shown in Equations 1 and 2 below, the processor 610 may calculate the first occupancy 628 by dividing the number of pixels of a region 622 occupied by the target lesion in the first X-ray image 620 by the number of pixels corresponding to the first criterion region 626, and calculate the second occupancy 638 by dividing the number of pixels of a region 632 occupied by the target lesion in the second X-ray image 630 by the number of pixels corresponding to the second criterion region 636.

$$\text{First occupancy} = \text{Size(number of pixels) of the target lesion in the criterion region of the first X-ray image/Size(number of pixels) of the criterion region of the first X-ray image} \qquad \text{<Equation 1>}$$

$$\text{Second occupancy} = \text{Size(number of pixels) of the target lesion in the criterion region of the second X-ray image/Size(number of pixels) of the criterion region of the second X-ray image} \qquad \text{<Equation 2>}$$

With the occupancies calculated as described above, the processor can compare the size of the target lesion in the two X-ray images regardless of the size of the X-ray image or the position of the patient, and may calculate the size change of the target lesion more accurately.

As shown, the processor may receive the first chest X-ray image 620 and determine a lung region (that is, the entire region) 624 in the first chest X-ray image 620, and determine the first criterion region 626 corresponding to the left lung region in the determined lung region 624. In addition, the processor may identify the target lesion region 622 in the first chest X-ray image 620. In this case, the target lesion region may refer to a region occupied by the target lesion in the criterion region. The processor may calculate the first occupancy 628 by dividing the number of pixels of the target lesion region 622 by the number of pixels of the first criterion region 626. Likewise, the processor may receive the second chest X-ray image 630 and determine a lung region 634 in the second chest X-ray image 630, and determine the second criterion region 636 corresponding to the left lung region in the determined lung regions 634. In addition, the processor may identify the target lesion region 632 in the second chest X-ray image 630. The processor may calculate the second occupancy 638 by dividing the number of pixels of the target lesion region 632 by the number of pixels of the second criterion region 636.

FIG. 6 shows an example in which the processor receives the first and second X-ray images 620 and 630, respectively, and calculates the occupancies, but aspects are not limited thereto. For example, the processor may receive the first X-ray image 620 and the second X-ray image 630 at the same time and calculate the occupancies. Alternatively, the processor may receive the first X-ray image 620 and the second X-ray image 630 in sequence and calculate the occupancies.

Figure 7:
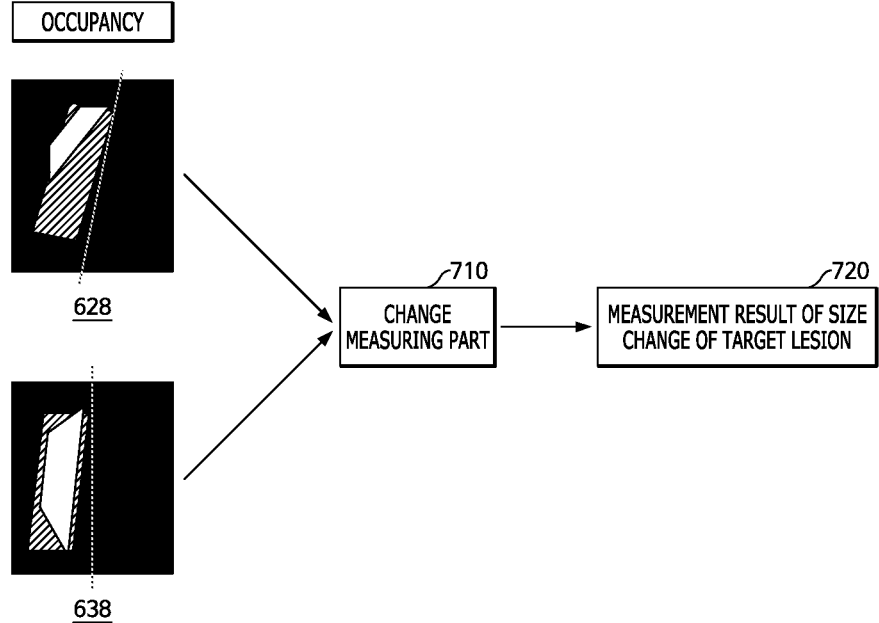
FIG. 7 is a diagram illustrating an example of generating a measurement result of a size change of a target lesion based on the first and second occupancies.

FIG. 7 is a diagram illustrating an example of generating a size change measurement result 720 of the target lesion based on the first occupancy 628 and the second occupancy 638. The processor (e.g., one or more processors of the information processing system) may measure the size change of the target lesion based on the calculated occupancies. For example, as shown, a change measuring part 710 in the processor may receive the first occupancy 628 and the second occupancy 638 calculated as described above, measure a size change of the target lesion, and generate the size change measurement result 720 of the target lesion. The size change measurement result 720 of the target lesion may include first occupancy information, second occupancy information, information on occupancy change amount of the target lesion, and/or information on size change of the target lesion (e.g., increase, decrease, no-change, and the like). In this example, the information on the occupancy change amount of the target lesion may be calculated as in Equation 3 below.

$$\text{Occupancy change amount of the target lesion=Second occupancy–First occupancy} \quad \text{<Equation 3>}$$

The user may need not only the numerically expressed amount of the change in occupancy of the target lesion, but also information on whether there is a change in the corresponding target lesion (e.g., information on increase, decrease, or no-change). The change measuring part 710 may determine whether there is a size change of the target lesion based on the first occupancy 628 and the second occupancy 638. For example, the change measuring part 710 may compare a value obtained by subtracting the first occupancy 628 from the second occupancy 638 with a threshold to determine whether there is a size change of the target lesion. That is, the change measuring part 710 may determine whether there is a size change of the target lesion based on a heuristic threshold. As an example, the threshold includes a first threshold t1 and a second threshold t2, and if a value obtained by subtracting the first occupancy 628 from the second occupancy 638 (that is, the occupancy change amount of the target lesion) is greater than or equal to the first threshold t1, an increase in the size of the target lesion may be determined. If the value obtained by subtracting the first occupancy 628 from the second occupancy 638 is less than the first threshold t1 and greater than or equal to the second threshold t2, no change in the size of the target lesion may be determined. If the value obtained by subtracting the first occupancy 628 from the second occupancy 638 is less than the second threshold t2, a decrease in the size of the target lesion may be determined. That is, a slight change may be assumed to be no-change. This is in consideration of the fact that the X-ray image may not correspond to completely accurate information.

The threshold may be determined based on a numerical value associated with a target metric calculated for the test set or a numerical value associated with prediction accuracy. That is, in order to set the first threshold t1 and the second threshold t2, the processor may receive a test set and obtain a threshold having a high specific metric (e.g., auc, accuracy, and the like) for the received test set. For example, the processor may arbitrarily find a threshold. Alternatively, since there is a curve with an operating point in an Area Under the Curve (AUC) metric, sensitivity and/or specificity of a specific threshold may be calculated. Considering this point, the processor may find a point where sensitivity and/or specificity are maximized and set it as a threshold. According to this method, the processor may set a first threshold between increase and no-change and a second threshold between decrease and no-change.

As another example, the change measuring part 710 may input a difference between the first occupancy 628 and the second occupancy 638 to the change determination model, and determine whether there is a size change of the target lesion based on the output determination result. In this example, the difference between the first occupancy 628 and the second occupancy 638 may refer to a value obtained by subtracting the first occupancy 628 from the second occupancy 638 (that is, an occupancy change amount for the target lesion). In addition, the change determination model may include a machine learning model trained to output a result of determining whether there is the size change of the reference target lesion based on an input value for the reference occupancy difference (or, for the reference occupancy change amount for the target lesion). The annotation work by the user may be required to generate and train the change determination model. For example, the processor may receive the reference occupancy change amount and the user's label information (increase, decrease, no-change) about whether there is a size change of the target lesion, and generate and train a machine learning model that outputs one of increase, decrease, and no-change of the target lesion according to input of the occupancy change amount. The change measuring part 710 may determine whether there is a size change of the target lesion by using the generated and trained machine learning model (e.g., the change determination model).

Figure 8:
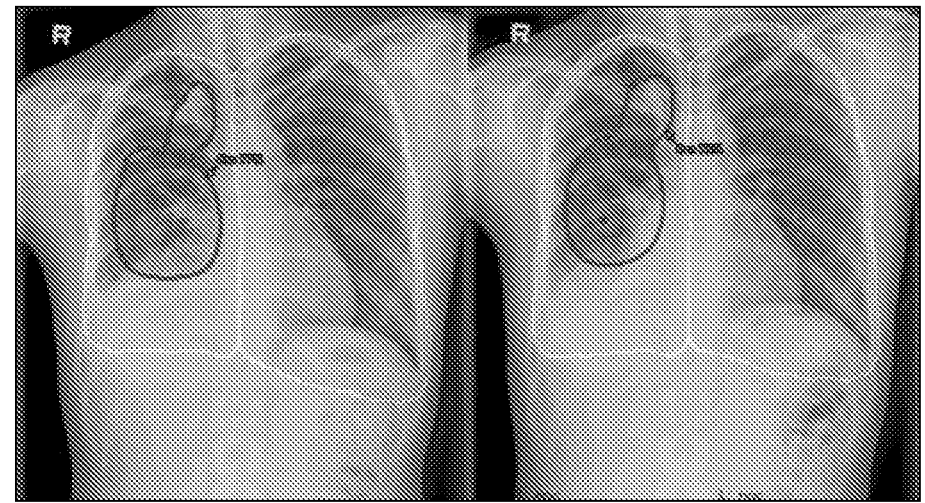
FIG. 8 is a diagram illustrating an example of measuring a size change of a target lesion in a chest X-ray image.

FIG. 8 is a diagram illustrating an example of measuring a size change of a target lesion in chest X-ray images 810 and 820. The processor (e.g., one or more processors of the information processing system) may measure the size of the entire region (e.g., lung) and/or the size of the criterion region (e.g., right lung) in the X-ray image. In addition, the processor may measure the size and position of the target lesion through a computer aided detection (CAD) method or the related algorithm.

As shown in a table 830 of FIG. 8, the size of the right lung region (lung_region1) on the first chest X-ray image 810 may be measured as 11389.0, and the size of the right lung region (lung_region2) on the second chest X-ray image 820 may be measured as 12076.0. That is, even in the X-ray images corresponding to the image of the lungs of the same individual/subject, the size of the lung region may be measured differently according to the size of the image, the position and/or condition of the individual/subject. In addition, on the first chest X-ray image 810, the size of the target region region1 in the right lung region may be measured as about 1739.8578, and the size of the target region region2 in the right lung region on the second chest X-ray image 820 may be measured as about 1553.8666. Accordingly, the first occupancy may be calculated by 1739.8578/11389.0 as about 0.15277, and the second occupancy may be calculated by 1553.8666/12076 as about 0.12867. The occupancy change amount (change ratio) of the target lesion may be calculated by 0.12867-0.15277 as about –0.0241.

The processor may determine whether there is a size change of the target lesion by comparing the calculated occupancy change amount of about –0.0241 with a threshold. For example, if the calculated occupancy change amount is less than the threshold (e.g., the second threshold), the processor may determine that the size of the target lesion is decreased. Alternatively, if the calculated occupancy change amount is greater than the first threshold and less than the second threshold, the processor may determine that the size of the target lesion is not changed. As another example, the processor input the calculated occupancy change amount (e.g., the difference between the first and second occupancies) into the change determination model so as to determine whether there is a size change of the target lesion based on the output determination result.

In the case of the lungs, there may be a size change on X-ray images according to inhalation or exhalation. In this case, since the size of the target lesion in the lung also changes, the ratio of the size of the target lesion to the size of the lung (that is, occupancy) is maintained. Thus, a change in this ratio may represent a substantial change in the target lesion. In addition, a plurality of lesions in the lungs may be separately detected, and occupancy and/or occupancy change amount for each lesion may be calculated, such that a size change of each lesion may be measured.

Figure 9:
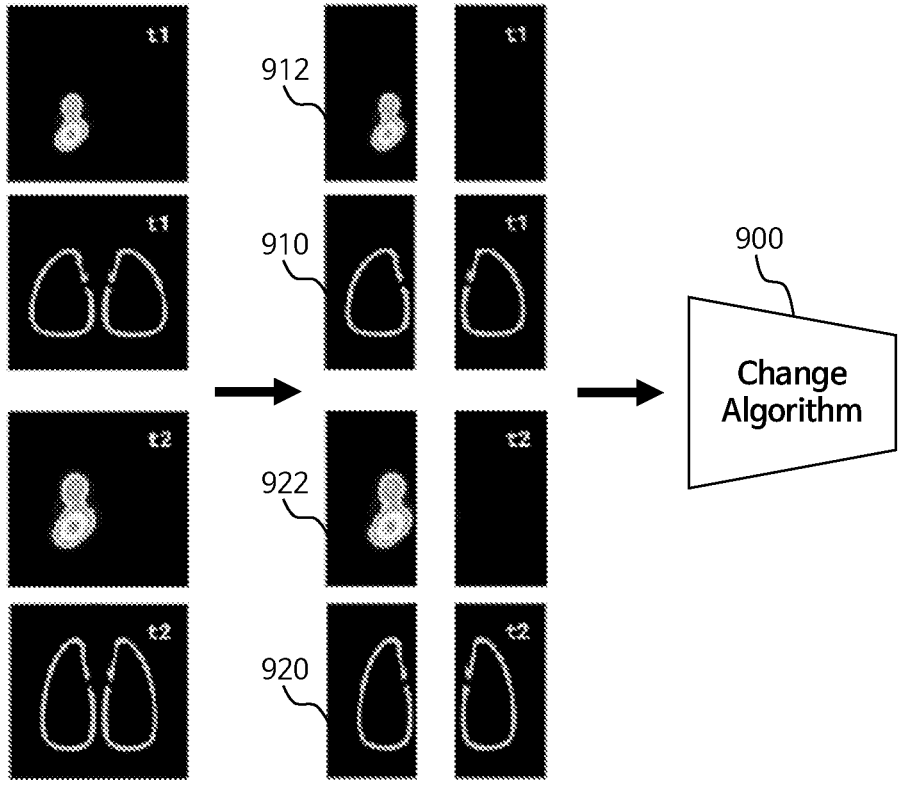
FIG. 9 is a diagram illustrating an example of determining an occupancy of a target lesion in a criterion region and measuring a size change of the target lesion.

FIG. 9 is a diagram illustrating an example of determining an occupancy of a target lesion in a criterion region and measuring a size change of the target lesion. The processor may determine (or calculate) a score for a first criterion region 910 (e.g., the size region, number of pixels, and the like of the first criterion region), a score for a second criterion region 920 (e.g., the size, the number of pixels, and the like of the second criterion region), a score for a target lesion 912 in the first criterion region and/or a score for a target lesion 922 in the second criterion region. The processor may calculate a change score using a change algorithm 900 based on the score for the first criterion region 910, the score for the second criterion region 920, the score for the target lesion 912 in the first criterion region, and the score for the target lesion 922 in the second criterion region.

For example, the processor may determine criterion regions 910 and 920 for each of the first X-ray image (imaged at time t1) and the second X-ray image (imaged at time t2 different from time t1) using the criterion region extraction model, and determine the scores for the criterion regions. In addition, the processor may determine a score for the target lesion 912 in the first criterion region using a target lesion detection model, a segmentation model, and the like. To this end, the processor may calculate target lesion prediction scores (or heat map values) for each of a plurality of pixels in the first criterion region. Likewise, the processor may calculate a target lesion prediction score for each of a plurality of pixels in the second criterion region using a target lesion detection model, a segmentation model, and the like, so as to determine the score for the target lesion 922 in the second criterion region.

The processor may determine a heat map value for each of a plurality of pixels in the target lesion region in the criterion region (e.g., a heat map value determined based on the target lesion prediction score), and calculate a score for the target lesion in each criterion region, as shown in Equation 4 below.

$$\text{output\_score} = f(\text{heat map}) \qquad \text{<Equation 4>}$$

where, heat map may represent a heat map value for the target lesion region, f(x) may represent any function for the value of x, and output_score may represent a score for the target lesion. For example, f(heat map) may represent the sum of heat map values for each of a plurality of pixels in the target lesion region. As another example, f(heat map) may represent an average value of the heat map values for each of a plurality of pixels in the target lesion region.

In addition, the processor may calculate a change score based on the calculated scores as shown in Equation 5 below. The processor may determine whether there is a size change of the target lesion and/or the amount of size change based on the calculated scores.

$$\text{change score} = g(\text{output\_score\_}t1, \text{area\_}t1, \text{output\_score\_}t2, \text{area\_}t2) \qquad \text{<Equation 5>}$$

where, output_score_t1 may represent a score for the target lesion in the first criterion region, area_t1 may represent a score for the first criterion region, output_score_t2 may represent a score for the target lesion in the second criterion region, area_t2 may represent a score for the second criterion region, and g(x, y, z, r) may represent any function for calculating a size change score of the target lesion by calculating a first occupancy and a second occupancy based on x, y, z, r.

The processor may calculate the first occupancy based on the score of the first criterion region 910 and the score of the target lesion 912 in the first criterion region, and calculate the second occupancy based on the score of the second criterion region 920 and the score of the target lesion 922 in the second criterion region. For example, the processor may calculate the first and second occupancies using Equations 6 and 7 below.

$$r_{t1} = \frac{\sum (\text{heatmap}_{t1} \cap \text{lungmask}_{t1})}{\sum \text{lungmask}_{t1}} \qquad \langle \text{Equation 6} \rangle$$

$$r_{t2} = \frac{\sum (\text{heatmap}_{t2} \cap \text{lungmask}_{t2})}{\sum \text{lungmask}_{t2}} \qquad \langle \text{Equation 7} \rangle$$

where, $\Sigma \text{lungmask}_{t1}$ may represent a score for the first criterion region, $\Sigma(\text{heatmap}_{t1} \cap \text{lungmask}_{t1})$ may represent a score for the target lesion in the first criterion region, $r_{t1}$ may represent the first occupancy, $\Sigma \text{lungmask}_{t2}$ may represent a score for the second criterion region, $\Sigma(\text{heatmap}_{t2} \cap \text{lungmask}_{t2})$ may represent a score for the target lesion in the second criterion region, and $r_{t2}$ may represent the second occupancy.

The processor may determine whether there is a size change of the target lesion based on the first and second occupancies. That is, the processor may calculate a change score (e.g., change score, occupancy change amount, and the like) based on the first and second occupancies, and determine whether there is a size change of the target lesion and/or the degree of change based on the calculated change score. For example, the processor may calculate the change score using Equation 8 below.

$$\text{change score} = r_{t2} - r_{t1} \qquad \text{<Equation 8>}$$

As another example, the processor may calculate the change score using Equation 9 below.

$$\text{change score} = \frac{r_{t2} - r_{t1}}{r_{t2} + r_{t1}} \qquad \langle \text{Equation 9} \rangle$$

As another example, the processor may calculate the change score using Equation 10 below.

$$\text{change score} = \left(1 - \frac{\min(r_{t1}, r_{t2})}{\max(r_{t1}, r_{t2})}\right) \cdot \text{sign}(r_{t2} - r_{t1}) \qquad \langle \text{Equation 10} \rangle$$

In Equations 8, 9, and 10 above, $r_{t1}$ may represent the first occupancy, and $r_{t2}$ may represent the second occupancy.

FIG. 9 illustrates a heat map for the target lesion in the criterion region as an example of calculating scores for the target lesion, but aspects are not limited thereto. For example, in order to calculate a score for the target lesion, prediction values, probability maps, and the like for the target lesion of each of a plurality of pixels in the criterion region may be used.

Figure 10:
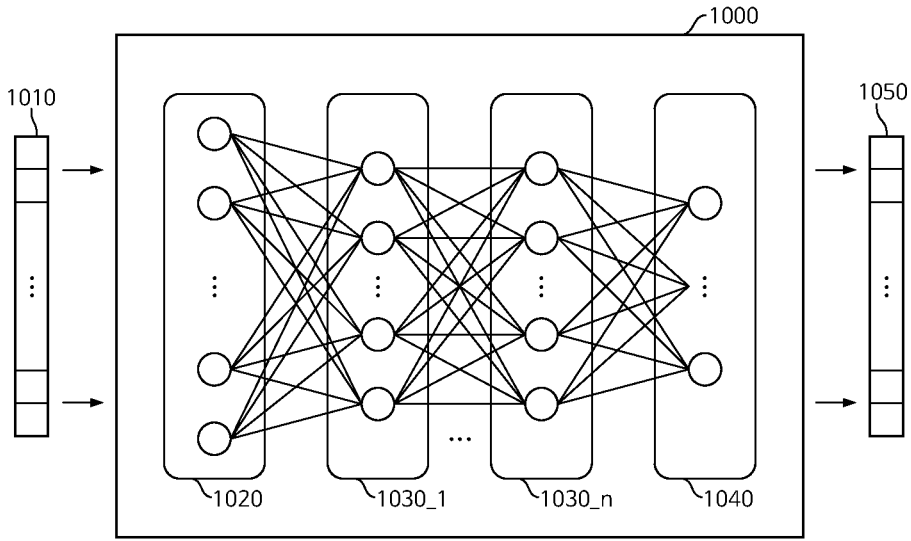
FIG. 10 illustrates an example of an artificial neural network model.

FIG. 10 illustrates an example of an artificial neural network model 1000. In machine learning technology and cognitive science, the artificial neural network model 1000 as an example of the machine learning model may refer to a statistical learning algorithm implemented based on a structure of a biological neural network, or to a structure that executes such algorithm.

The artificial neural network model 1000 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 1000 may include any probability model, neural network model, and the like, that is used in artificial intelligence learning methods such as machine learning and deep learning.

The artificial neural network model 1000 may include an artificial neural network model configured to determine a criterion region from the input X-ray image. Additionally or alternatively, the artificial neural network model 1000 may include an artificial neural network model that identifies a target lesion from the input X-ray image. Additionally or alternatively, the model may include an artificial neural network model configured to input a difference between the first and second occupancies (e.g., an occupancy change amount for the target lesion) and output a result of determining whether there is a size change of the target lesion (e.g., whether the target lesion is increased, decreased, or not changed).

The artificial neural network model 1000 is implemented as a multilayer perceptron (MLP) formed of multiple nodes and connections between them. The artificial neural network model 1000 may be implemented using one of various artificial neural network model structures including the MLP. As illustrated in FIG. 10, the artificial neural network model 1000 may include an input layer 1020 to receive an input signal or data 1010 from the outside, an output layer 1040 to output an output signal or data 1050 corresponding to the input data, and (n) number of hidden layers 1030_1 to **1030_*n* (where n is a positive integer) positioned between the input layer 1020 and the output layer 1040 to receive a signal from the input layer 1020, extract the features, and transmit the features to the output layer 1040. In an example, the output layer 1040 receives signals from the hidden layers 1030_1 to 1030_*n*** and outputs them to the outside.

The method of training the artificial neural network model 1000 includes the supervised learning that trains to optimize for solving a problem with inputs of teacher signals (correct answers), and the unsupervised learning that does not require a teacher signal. The information processing system may train the artificial neural network model 1000 by supervised learning and/or unsupervised learning to output a criterion region from the X-ray image. For example, the information processing system may train the artificial neural network model 1000 to output a criterion region from an X-ray image by supervised learning, using a plurality of reference X-ray images and label information for the criterion regions. Additionally or alternatively, the information processing system may train the artificial neural network model 1000 by supervised learning and/or unsupervised learning to divide the entire region (e.g., lung region) of the X-ray image into a plurality of regions so as to determine and output a criterion region. In another example, the information processing system may train the artificial neural network model 1000 by supervised learning and/or unsupervised learning to output the result of determining whether there is a size change of the target lesion in response to an input of the difference between the first and second occupancies into the change determination model. For example, the information processing system may train the artificial neural network model 1000 by supervised learning to output a result of determining whether there is a size change of the reference target lesion based on the input value for the reference occupancy difference (e.g., reference occupancy change amount for the target lesion).

The artificial neural network model 1000 trained as described above may be stored in a memory (not shown) of the information processing system, and may determine a criterion region and/or a target lesion region from the X-ray image in response to input of an X-ray image received from the communication module and/or memory, and output the criterion region and/or the target lesion region. Additionally or alternatively, in response to an input for a difference in occupancy of the target lesion (e.g., an occupancy change amount for the target lesion) in a plurality of X-ray images, the artificial neural network model 1000 may determine whether there is a size change of the target lesion and output a result of determining whether there is a size change of the target lesion.

An input variable of the machine learning model for determining the criterion region, that is, the input variable of the artificial neural network model 1000 may be one or more X-ray images. For example, the input variable input to the input layer 1020 of the artificial neural network model 1000 may be an image vector 1010 which may be one or more X-ray images configured as one vector data element. The output variable output from the output layer 1040 of the artificial neural network model 1000 in response to the input of the image may be a vector 1050 representing or characterizing the criterion region and/or target lesion region in the X-ray image. Additionally, the output layer 1040 of the artificial neural network model 1000 may be configured to output vectors representing or characterizing a plurality of regions obtained by dividing the entire region of the X-ray image. In this case, the criterion region may be a region including at least one of the plurality of regions. In the present disclosure, the output variable of the artificial neural network model 1000 is not limited to the types described above, and may include any information or data representing the criterion region and/or the target lesion region in the X-ray image.

In another example, the input variable of the machine learning model for determining whether there is a size change of the target lesion, that is, the input variable of the artificial neural network model 1000 may be a difference between the first and second occupancies for the target lesion (e.g., a value obtained by subtracting the first occupancy from the second occupancy rate, or an occupancy change amount for the target lesion). For example, an input variable input to the input layer 1020 of the artificial neural network model 1000 may be a numerical vector 1010 including a difference between the first and second occupancies as one vector data element. An output variable output from the output layer 1040 of the artificial neural network model 1000 in response to an input of the difference between the first occupancy and second occupancy may be the vector 1050 representing or characterizing the result of determining whether there is a size change of the target lesion. In the present disclosure, the output variable of the artificial neural network model 1000 is not limited to the type described above, and may include any information or data representing a result of determining whether there is a size change of the target lesion. In addition, the output layer 1040 of the artificial neural network model 1000 may be configured to output a vector representing reliability and/or accuracy of the output criterion region, target lesion region, and a result of determining whether there is a size change of the target lesion.

As described above, the input layer 1020 and the output layer 1040 of the artificial neural network model 1000 are respectively matched with a plurality of output variables corresponding to a plurality of input variables, and as the synaptic values between nodes in the input layer 1020, and the hidden layers 1030_1 to 1030_n, and the output layer 1040 are adjusted, training can be processed to extract a correct output corresponding to a specific input. Through this training process, the features hidden in the input variables of the artificial neural network model 1000 may be confirmed, and the synaptic values (or weights) between the nodes of the artificial neural network model 1000 may be adjusted so as to reduce the errors between the output variable calculated based on the input variable and the target output. Using the artificial neural network model 1000 trained as described above, the information (e.g., position, size, number of pixels, and the like) for the criterion region and/or the target lesion region may be output from the X-ray image in response to the input X-ray image. Additionally, using the artificial neural network model 1000, a result of determining whether there is a size change of the target lesion may be output in response to the input of the occupancy change amount for the target lesion (e.g., the difference between the first and second occupancies for the target lesion).

The above description of the present disclosure may be provided to enable those skilled in the art to make or use the present disclosure. Various modifications of the present disclosure will be readily apparent to those skilled in the art, and the general principles defined herein may be applied to various modifications without departing from the spirit or scope of the present disclosure. Thus, the present disclosure is not intended to be limited to the examples described herein but may be intended to be accorded the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the present disclosure has been described in connection with certain examples herein, it should be understood that various modifications and changes can be made without departing from the scope of the present disclosure, which can be understood by those skilled in the art to which the present disclosure pertains. Further, such modifications and changes are intended to fall within the scope of the claims appended herein.

The invention claimed is:

1. A method performed by one or more computing devices to measure a size change of a target lesion in an X-ray image, the method comprising:

receiving a first X-ray image including the target lesion and a second X-ray image including the target lesion;

inputting the first X-ray image to a criterion region extraction model to obtain the first criterion region from the first X-ray image and inputting the second X-ray image to the criterion region extraction model to obtain the second criterion region from the second X-ray image, wherein the criterion region extraction model is trained, using a plurality of reference X-ray images and label information for reference criterion regions, to output a criterion region based on an input X-ray image;

identifying the target lesion in the first criterion region and in the second criterion region by using a target lesion detection model to calculate target lesion prediction scores for each of a plurality of pixels in the first criterion region and the second criterion region, wherein a target lesion prediction score comprises a probability value between 0 and 1, inclusive;

calculating an occupancy of a region corresponding to the target lesion with respect to a criterion region in each of the first X-ray image and the second X-ray image, the calculating comprising:

calculating a first occupancy by dividing a sum of the target lesion prediction scores of the pixels in the first criterion region by a size of the first criterion region or by a prediction score of the first criterion region; and calculating a second occupancy by dividing a sum of the target lesion prediction scores of the pixels in the second criterion region by a size of the second criterion region or by a prediction score of the second criterion region; and obtaining a measurement result by measuring the size change of the target lesion based on a difference between the first occupancy and the second occupancy.

2. The method according to claim 1, wherein the second criterion region corresponds to the first criterion region.

3. The method according to claim 1, wherein the measuring the size change of the target lesion comprises:

comparing the difference between the first occupancy and the second occupancy with a threshold.

4. The method according to claim 3, wherein the threshold is determined based on a numerical value associated with a target metric calculated for a test set or based on a numerical value associated with prediction accuracy.

5. The method according to claim 3, wherein the threshold includes a first threshold and a second threshold, if the calculated occupancy change amount for the target lesion is greater than or equal to the first threshold, it is determined that there is an increase in size of the target lesion, if the calculated occupancy change amount for the target lesion is less than the first threshold and greater than or equal to the second threshold, it is determined that there is no change in the size of the target lesion, and if the calculated occupancy change amount for the target lesion is less than the second threshold, it is determined that there is a decrease in the size of the target lesion.

6. The method according to claim 1, wherein the measuring the size change of the target lesion comprises:

calculating an occupancy change amount for the target lesion based on the first occupancy and the second occupancy; and inputting the calculated occupancy change amount for the target lesion into a change determination model to output a determination result, and determining the size change of the target lesion based on the output determination result, and wherein the change determination model includes a machine learning model trained to output a result of determining whether there is a size change of a reference target lesion based on an input value indicating a reference occupancy change amount for the reference target lesion.

7. An information processing system comprising:

a memory storing one or more instructions; and a processor configured to execute the stored one or more instructions to:

receive a first X-ray image including the target lesion and a second X-ray image including the target lesion;

input the first X-ray image to a criterion region extraction model to obtain the first criterion region from the first X-ray image and input the second X-ray image to the criterion region extraction model to obtain the second criterion region from the second X-ray image, wherein the criterion region extraction model is trained, using a plurality of reference X-ray images and label information for reference criterion regions, to output a criterion region based on an input X-ray image;

identify the target lesion in the first criterion region and in the second criterion region by using a target lesion detection model to calculate target lesion prediction scores for each of a plurality of pixels in the first criterion region and the second criterion region, wherein a target lesion prediction score comprises a probability value between 0 and 1, inclusive;

calculate an occupancy of a region corresponding to the target lesion with respect to a criterion region in each of the first X-ray image and the second X-ray image by:

calculating a first occupancy by dividing a sum of the target lesion prediction scores of the pixels in the first criterion region by a size of the first criterion region or by a prediction score of the first criterion region; and calculating a second occupancy by dividing a sum of the target lesion prediction scores of the pixels in the second criterion region by a size of the second criterion region or by a prediction score of the second criterion region;

obtain a measurement result by measuring the size change of the target lesion based on a difference between the first occupancy and the second occupancy.

8. The information processing system according to claim 7, wherein the second criterion region corresponds to the first criterion region.

9. The information processing system according to claim 7, wherein the processor is further configured to measure the size change of the target lesion by comparing the difference between the first occupancy and the second occupancy with a threshold.

10. The information processing system according to claim 9, wherein the threshold is determined based on a numerical value associated with a target metric calculated for a test set or based on a numerical value associated with prediction accuracy.

11. The information processing system according to claim 9, wherein the threshold includes a first threshold and a second threshold, and wherein the processor is further configured to:

if the calculated occupancy change amount for the target lesion is greater than or equal to the first threshold, determine that there is an increase in size of the target lesion, if the calculated occupancy change amount for the target lesion is less than the first threshold and greater than or equal to the second threshold, determine that there is no change in the size of the target lesion, and if the calculated occupancy change amount for the target lesion is less than the second threshold, determine that there is a decrease in the size of the target lesion.

12. The information processing system according to claim 7, wherein the processor is further configured to:

calculate an occupancy change amount for the target lesion based on the first occupancy and the second occupancy; and input the calculated occupancy change amount for the target lesion into a change determination model to output a determination result, and determine the size change of the target lesion based on the output determination result, and wherein the change determination model includes a machine learning model trained to output a result of determining whether there is a size change of a reference target lesion based on an input value indicating a reference occupancy change amount for the reference target lesion.

13. The method according to claim 1, further comprising: transmitting the measurement result to a user terminal to cause the user terminal to output information indicating the size change.

14. The information processing system according to claim 7, wherein the processor is further configured to: transmit the measurement result to a user terminal to cause the user terminal to output information indicating the size change.

* * * * *